United States Patent [19]

Lytton

[11] 4,195,001

[45] Mar. 25, 1980

[54] FORMULATIONS AND PROCESS FOR EFFECTING STOPPAGE OF LEAKS OF LIQUID FROM TANKS, PIPES AND THE LIKE

[75] Inventor: Donald B. Lytton, Lincolnwood, Ill.

[73] Assignee: Lake Chemical Co., Chicago, Ill.

[21] Appl. No.: 930,514

[22] Filed: Aug. 3, 1978

Related U.S. Application Data

[63] Continuation-in-part of Ser. No. 809,153, Jun. 23, 1977, abandoned.

[51] Int. Cl.² .................. C08L 91/06; C09K 3/10; C09K 3/12
[52] U.S. Cl. .................................... 260/28 R; 106/33
[58] Field of Search ............... 260/28 R, 28 P; 106/33

[56] References Cited

U.S. PATENT DOCUMENTS

| | | | |
|---|---|---|---|
| 1,299,273 | 4/1919 | Weaber et al. | 106/33 |
| 2,267,033 | 12/1941 | Kerkling | 106/33 X |
| 2,325,726 | 8/1943 | Acker | 106/33 X |
| 2,460,181 | 1/1949 | Marshall | 106/33 X |
| 2,623,830 | 12/1952 | Aronberg | 106/33 X |
| 2,925,350 | 2/1960 | Moore | 106/33 |
| 3,159,499 | 12/1964 | Jorda | 427/142 X |
| 3,160,518 | 12/1964 | Jorda | 260/18 EP X |
| 3,160,596 | 12/1964 | Spencer | 260/28 |
| 3,580,870 | 5/1971 | Rosner | 106/33 X |
| 3,882,064 | 5/1975 | Pregmon | 260/28 |
| 3,963,677 | 6/1976 | Erger | 260/28 R |
| 3,996,175 | 12/1976 | Schreiber et al. | 260/28 P |
| 4,042,550 | 8/1977 | Tuller | 260/28 P |

FOREIGN PATENT DOCUMENTS

| | | | |
|---|---|---|---|
| 504358 | 7/1954 | Canada | 106/33 |
| 837424 | 6/1960 | United Kingdom | 106/33 |
| 412216 | 10/1974 | U.S.S.R. | 106/33 |

*Primary Examiner*—Sandra M. Person
*Attorney, Agent, or Firm*—Wallenstein, Spangenberg, Hattis & Strampel

[57] ABSTRACT

Formulations, and process, particularly for temporarily, but effectively, stopping leaks in tanks or pipes and the like through which liquids such as gasoline, oil, water or similar liquids are running or flowing, at low pressures, until a permanent repair of the leak of crevice through which said liquid is seeping can later be made. The formulations are in the form of two separate compositions, each of which is of generally putty consistency, which are blended together just prior to use to form a product having a putty or putty-like consistency which is pressed into the area through which leakage of the liquids is occurring. The formulations, when blended together or admixed for use, contain one or more epoxy resins, one or more epoxy curing agents, one or more waxes or waxy materials, and, advantageously, one or more fillers, with or without minor proportions of one or more supplemental ingredients.

20 Claims, No Drawings

FORMULATIONS AND PROCESS FOR EFFECTING STOPPAGE OF LEAKS OF LIQUID FROM TANKS, PIPES AND THE LIKE

This application is a continuation in-part of application Ser. No. 809,153, filed June 23, 1977 and now abandoned.

My invention is directed to novel formulations and to a process involving the utilization thereof for highly effectively enabling, particularly, the temporary repair of leaks, for instance, around rivets or the like, in tanks or pipes or the like through which liquids, such as gasoline, oils, water, and other oleaginous or aqueous liquids, prior to the application and hardening of the formulations of this invention, are running or flowing under low pressure, generally of the order of about 3 or 5 to about 10 pounds per square inch. One particular, but simply illustrative, field of usage of the formulations of my present invention is for stopping, temporarily, the leaking or seepage of gasoline or diesel fuels from the wing tanks of aircraft in those instances where leakage or seepage has occurred due to a leak, such as around a rivet, or the like, in the wing tank. The formulations of my invention are highly effective to stop such leakage or seepage while the liquid is running or flowing through the wing tanks and such stoppage continues for at least about 4 or 5 to 10 hours or more, until time permits of later making a permanent repair of the crack or the like responsible for the leakage or seepage. Of course, after curing of the compositions, the repaired leak is capable of withstanding very much higher pressures of liquids.

Compositions for the foregoing purposes have heretofore been known to the art and have been commercially used. All of them, however, so far as I am aware, have been characterized by one or more deficiencies among which have been, for instance, difficulty to work with or handle, inadequacy of the sealing and/or the length of time that the temporary seal would last, and effecting good seals especially quickly on oily surfaces. Such prior art compositions of which I am aware which have been used for the aforesaid purpose have been single compositions in stick form, such as are disclosed in U.S. Pat. No. 2,623,830, which compositions utilize a wax or waxy material and a drying oil, such as tung oil, which, upon oxidation by air, forms a sealant film, and which provide reasonably satisfactory results; or have been putty compositions which, in use, were found not to be satisfactory.

It has also been known to the art, as shown in U.S. Pat. Nos. 3,159,499 and 3,160,518, to prepare putty compositions for repairing holes, cracks, pits and the like in water pipes, electrical conduits and boat hulls, i.e. repairs in wet surfaces, containing, in a composition A, an amine curing agent, filler and pigment; and, in a composition B, a polyepoxide and filler, said compositions A and B being combined to produce a putty-like composition. Such compositions are incapable of stopping and are ineffective to stop the leakage of flowing water, flowing at low pressures, while leakage is occurring through a crack, crevice or hole in pipes or tanks at the time of their application, at least prior to the time that substantial curing of the epoxide resin base has occurred. In sharp contrast thereto, compositions made in accordancw with my invention effect such stoppage of leakage promptly after application and prior to any material or appreciable curing of the epoxide resin base occurring.

The formulations utilized in accordance with my present invention overcome the deficiencies of the prior art compositions of which I am aware and have gone into commercial usage, replacing such prior art compositions. The formulations of my invention, when prepared for use, have an initial putty-like consistency, and contain epoxy resin based compositions which include epoxy resins, curing agents for said resins, waxes or waxy materials and, in their particularly advantageous embodiments, fillers, with or without minor proportions of supplemental ingredients, all as is hereafter disclosed in detail.

The formulations of the present invention, as noted above, comprise two separate cooperating compositions each of which is in the form of putty or putty-like consistency. One of said compositions, which, for convenience, may be called the A composition, is made from an epoxy resin which is normally liquid, that is liquid at ambient or substantially ambient temperatures, and/or (a) a pulverulent or finely divided inert or essentially inert solid filler, and (b) a waxy material which is solid at room or ambient or substantially ambient temperatures and which, most advantageously, is soluble in or compatible with the normally liquid epoxy resin. The A composition can contain small or minor proportions of various supplemental agents. Most desirably, the A composition contains both said filler and said wax or waxy material and, as stated above, said A composition in of putty or putty-like consistency.

The other of said compositions, which, for convenience, may be called the B composition, contains the curing agent or agents for the epoxy resin of the first composition, and/or (a) a pulverulent or finely divided inert or essentially inert solid filler, and (b) a wax or waxy material which is solid at room or ambient or substantially ambient temperatures. Again, most desirably, the B composition contains both said filler and said wax or waxy material and, as stated above, said B composition is of putty or putty-like consistency.

The inert filler and the wax or waxy material which may be used in the composition B may be the same filler and the same wax or waxy material as utilized in the A composition, or it may be a different filler and a different wax or waxy material. Supplemental materials may also be incorporated into the B composition.

Generally speaking, where fillers are not employed, which, as noted above, represents the distinctly less advantageous embodiments of the present invention, putty or putty-like A and B compositions can generally be obtained by increasing the proportions of wax or waxy materials over what would be utilized where the A and B compositions contained both fillers and waxes or waxy materials.

It may also be pointed out that reasonably good results are also obtained where, for instance, the A composition contains both the inert filler and the wax or waxy material, and the B composition does not contain both the filler and the wax or waxy material, subject, however, to both the finished A and B compositions having a putty or putty-like consistency.

The liquid epoxy resins can be selected from among the large members of those which are well known to the art. It will, of course, be understood that optimum results are not obtained with all liquid epoxy resins. However, those which can be used are, as indicated above, liquids at room or normal or ambient temperatures and particularly desirable are those which are methylol modified bisphenol A type diglycidol ethers. Various of these are sold under the trademark "Apogen" (Schaefer Chemicals Inc., Riverton, N.J.) and expecially desirable is that sold under the designation "Apogen" 102 which is characterized by fast curing properties at low temperatures, and which has a weight per epoxide of 195–210, a viscosity in CPS of 45,000–65,000 at 25° C., and has a density of 1.14–1.18 at 25° C. Since, as indicated above, many normally liquid epoxy resins which are curable by conventional curing agents to a hard or rigid mass are well known to the art and are commercial articles of commerce, no further or detailed description of them is necessary.

Any of the many known epoxy resin curing agents can be used, such being well known to the art, but it is especially desirable that they be oil-soluble or reasonably readily dispersible in oil. They include, among other compounds or types of compounds, cycloaliphatic amines, polyamides and amido-amines. Very satisfactory for use in the practice of the present invention are those sold under the trademark ANCAMIDE (Pacific Anchor Chemical Corporation), and that sold under the designation ANCAMIDE 503. Various other illustrative curing agents are aliphatic polyamines such as DETA, and phenalkamine curing agents sold under the trademark CARDOLITE (Minnesota Mining & Manufacturing Co.) such as CARDOLITE NC-540 and NC-541, or mixtures thereof. The ANCAMIDES and the CARDOLITES also enhance the property of the formulations, when applied to a metal surface through which oil is flowing and which has developed a leak, to adhere to the oily surfaces. In conjunction with the wax or waxy material, the adherence of the formulations to oily surfaces and the ability to effect a seal quickly and effectively prior to curing occurring represent important advantages of the optimal embodiments of the present invention.

The waxes or waxy materials which can be used can be selected from a large group which includes natural as well as synthetic waxes and waxy materials, among which are, by way of illustration, castor wax, "Paracin" waxes, such as "Paracin" 285 (National Lead Company), and synthetic waxes. Especially satisfactory are such synthetic waxes such as those sold under the trademark "Acrawax" (Glyco Products Company, New York, N.Y.). These synthetic waxes are, in general, octadecenamides. The different Acrawaxes have different melting points. Others of such Acrawaxes have melting points in the range of about 137°–139° C. The Acrawax having a melting point in the range of about 94°–97° C. is particularly advantageously utilized. The waxes or waxy materials used should be soluble in or compatible in what would constitute a mixture of the liquid epoxy resin and the liquid curing agent ingredients of the A and B compositions which constitute the formulations of the present invention. Mixtures of two or more of said waxes or waxy materials can, of course, be employed.

The finely divided or pulverulent inert fillers, which advantageously have an average particle size in the range of about 5 to 100 microns, which can effectively be employed are many, among which, by way of illustration, are talc, silica flour, carbon black, graphite, zinc oxide, clays such as bentonite clays, montmorillonite, calcium carbonate, barium carbonate, titanium dioxide, and the like, or mixtures of two or more thereof. Particularly satisfactory are talc and silica flours. Generally speaking, it is preferred to employ fillers, such as silica flour and talc, of a particle size such that about 99% will pass through a 325 mesh screen. The particle size, however, as noted above, is variable within appreciable limits.

Epoxy resin flexiblizers are desirably incorporated into the composition, particularly into the A composition. These types of materials are well known to the art dealing with epoxy resins. Illustrative thereof are aliphatic triglycidyl ethers, such as di- and triglycidyl ethers of propylene glycol, and aliphatic difunctional epoxy resins. Particularly satisfactory flexibilizers for use in the present invention are those sold under the trademark CARDOLITE (Minnesota Mining & Manufacturing Co.), that sold under the designation CARDOLITE NC-513 being highly satisfactory.

The proportions of the ingredients in each of the A and B compositions are variable within appreciable limits subject to the proviso, as indicated above, that each of said compositions, prior to mixing or blending, has a putty or putty-like consistency. In general, the proportions of ingredients, in terms of percentages by weight, and taking Example 1, which follows below, as illustrative, and omitting or excluding the filler in said percentages, the particular filler and the particular percentage thereof not being critical, the proportions will generally fall within the following approximate ranges:

| A. Epoxy Composition | Example 1 | Range |
|---|---|---|
| Apogen 102 | 66% | 20%–78% |
| Cardolite NC-513 | 16% | 5%–20% |
| Acrawax | 18% | *%–75% |

| B. Curing Composition | Example 1 | Range |
|---|---|---|
| Ancamide 503 | 55% | 25%–98% |
| Acrawax | 45% | *%–75% |

*See paragraph immediately below.

The total amount of wax and/or waxy material present in both the A and B compositions is at least 10%, better still at least 20%, and, especially advantageously, is from about 30 to 40%, by weight, and can be materially higher such as up to about 75%. The waxes or waxy materials, as more generally indicated above, can be divided between the A and B compositions in variable proportions, as may be desired, subject to the foregoing proviso, namely, that each of the A and B compositions, prior to mixing or blending, has a putty or putty-like consistency.

As indicated above, supplemental agents can be included in certain cases to obtain special effects or an enhancement of existent properties of the A and B compositions absent said supplemental agents. Thus, for instance, as noted above, flexibilizers can be incorporated. Again, in certain cases, small proportions of wetting agents, preferably those of the nonionic type, which are well known to the art, can be included in the A and/or B compositions, generally in amounts of the order of about 0.2 to about 1%, by weight of the compositions. They tend to aid in displacing oil or water, depending on their nature, adjacent the crevices or the like where liquid may be flowing at the time that the formulations are applied to effect the temporary stoppage or sealing of said crevices or the like.

The following examples are illustrative of formulations made in accordance with the present invention. It will be understood that many other formulations can readily be made by utilizing different liquid epoxy resins, different liquid epoxy curing agents, different waxes, different fillers where fillers are used, and different proportions of said ingredients, as well as the inclusion of supplemental ingredients. All parts listed are by weight. The A composition will, in general, be admixed with a lesser amount of the B composition, commonly of the order of 2 to 4 parts of the A composition to 1 part of the B composition, by weight, depending on the particular compositional nature of said compositions. However, compositions can readily be prepared in which, when intermixed, the B composition will be used in proportions greater than that of the A composition. The best embodiments of the invention known at the present time are reflected by said Examples, with Example 1 being particularly preferred.

EXAMPLE 1

| A. Epoxy Composition | |
|---|---|
| Apogen 102 | 20 |
| Cardolite NC-513 | 5 |
| Acrawax | 10 |
| Titanium Dioxide | 0.5 |
| Silica Flour | 69.5 |
| B. Curing Composition | |
| Ancamide 503 | 23.25 |
| Acrawax | 18.5 |
| Talc | 58.25 |

The total wax content of the A and B compositions in this Example, based as indicated above, is approximately 37%.

EXAMPLE 2

| A. Epoxy Composition | |
|---|---|
| Apogen 102 | 22 |
| Cardolite NC-513 | 6 |
| Acrawax | 12 |
| Zinc Oxide | 0.3 |
| Talc | 70 |
| B. Curing Composition | |
| Ancamide 400 | 24 |
| Acrawax | 8 |
| Talc | 60 |

The total wax content of the A and B compositions in this Example, based as indicated above, is about 22%.

EXAMPLE 3

| A. Epoxy Composition | |
|---|---|
| Epoxy (Epon 828) (Shell Oil Company) | 25 |
| Cardolite NC-513 | 6 |
| Castor Wax | 15 |
| Titanium Dioxide | 0.6 |
| Calcium Carbonate | 70 |
| B. Curing Composition | |
| Ancamide 503 | 28 |
| Acrawax | 20 |
| Talc | 52 |

The total wax content of the A and B compositions in this Example, based as indicated above, is about 37%.

EXAMPLE 4

| A. Epoxy Composition | |
|---|---|
| Epoxy (Epon 828) | 23.15 |
| Acrawax | 11.58 |
| Titanium Dioxide | 0.46 |
| Silica Flour | 6 |
| | 4.81 |
| B. Curing Composition | |
| Ancamide 503 | 13.92 |
| Ancamine AD | 9.28 |
| Acrawax | 18.56 |
| Talc | 58 |
| Lampblack | 0.24 |

The total wax content of the A and B compositions in this Example, based as indicated above, is approximately 39%.

Each of compositions A and B is of putty or putty-like consistency and it is desirable and convenient to form them into small flat disks about ¼ to ⅜ inches in thickness, or spheres or various other shapes or the compositions can be placed in suitable individual containers from which desired quantities of each may be removed for admixture and blending generally as described below. The A and B compositions are also advantageously made so as to have readily distinguished colors to delineate the A and B compositions and in units representing the weight ratios of the A and B compositions which are to be blended together for use so that, for instance, when made in the form of disks, one disk of composition A may be blended with one disk of composition B. In use, one disk of composition A containing, for instance, 11 parts by weight, and one disk of composition B containing, for instance, 4 parts by weight, are conveniently rolled together between the palms of the hands of an individual to effect a preliminary blending of the two disks. The final blending or mixing may then be effected between the thumbs and forefingers, with occasional rolling between the palms of the hands. When mixing or blending are completed to form a substantially homogeneous composition, the putty or putty-like formulation, which is slightly warm to the touch, is pressed with the fingers or with a spatula or the like into the leaking area or areas, for instance, in the leaking area or areas of the wing tank of an airplane through which oil is flowing at low pressure and which is wet with oil. The formulation is pressed firmly into all crevices or, if the leak is around rivets, in the rivet area or areas very shortly after which the leakage stops. In about 1 to several hours, commonly about 4 to 5, depending upon the particulars, the formulation sets up to a hard or rigid resinous mass which serves as a temporary seal effective for many hours until time permits of a permanent repair of the crevices or the like to be made. While the invention is especially valuable for the temporary stoppage of leaks in tanks, pipes and the like through which oil or oleaginous liquids are flowing, it is also useful as a more permanent leakage stopper in systems where the flowing liquids are water or aqueous liquids.

What is claimed is:
1. A formulation for stopping seepage or like leaks in tanks and pipes through which liquids are flowing at low pressures or through which liquids are adapted to flow, said formulation having an initial putty or putty-like consistency as prepared, and being prepared by admixing separate A and B compositions, as set forth below, each of which has a putty or putty-like consistency and comprises:

A. A normally liquid epoxide resin base and a compatible wax or waxy material;

B. A normally liquid curing agent for said normally liquid epoxide resin base of composition A, and a compatible wax or waxy material; said compatible wax or waxy material being present in an amount in relation to and in cooperation with said epoxide resin base and said curing agent, when said A and B compositions are admixed in predetermined proportions and applied to a crevice or the like through which said liquids are flowing or adapted to flow, to effect stoppage of said seepage shortly after such application and substantially prior to the curing of said epoxide resin base being completed, said amount of the wax or waxy material content of the A and B compositions constituting at least about 10%, by weight, of the total of the A and B compositions based upon the sum of the epoxide resin base, the curing agent and the wax or waxy material.

2. The formulation of claim 1, in which the A and B compositions are differently colored so that they may be clearly differentiated visually.

3. The formulation of claim 1, in which at least one of the A and B compositions also contains a substantially inert filler.

4. The formulation of claim 1, in which the wax or waxy material is an octadecenamide synthetic wax.

5. The formulation of claim 1, in which the A composition is present in proportions greater than that of the B composition.

6. The formulation of claim 1, in which said total of the wax or waxy material content of the A and B compositions constitutes from about 30% to about 40%.

7. A formulation having particular utility for stopping seepage or like leaks in tanks and pipes through which liquids are flowing at low pressures or through which liquids are adapted to flow, said formulation having a putty or putty-like consistency as prepared, and being prepared by admixing separate A and B compositions, as set forth below, each of which has a putty or putty-like consistency:

A. A normally liquid epoxide resin base, a compatible wax or waxy material, and a substantially inert pulverulent filler;

B. A normally liquid curing agent for said normally liquid epoxide resin base of composition A, a compatible wax or waxy material, and a substantially inert pulverulent filler;

said compatible wax or waxy material being present in an amount in relation to and in cooperation with said epoxide resin base and said curing agent, when said A and B compositions are admixed in predetermined proportions and applied to a crevice or the like through which said liquids are flowing or adapted to flow, to effect stoppage of said seepage shortly after such application and substantially prior to the curing of said epoxide resin base being completed, said amount of the wax or waxy material content of the A and B compositions constituting at least about 10%, by weight, of the total of the A and B compositions based upon the sum of the epoxide resin base, the curing agent and the wax or waxy material.

8. The formulation of claim 7, in which the A composition is present in proportions greater than that of the B composition.

9. The formulation of claim 8, in which the wax or waxy material is an octadecenamide synthetic wax.

10. The formulation of claim 9, in which the filler in each of the A and B compositions is at least one material from the group consisting of silica flour and talc.

11. The formulation of claim 7, in which the total of the wax or waxy material content of the A and B compositions constitutes from about 30% to about 40%.

12. A formulation according to claim 3, in which the A and B compositions are as follows, in relation to each other, exclusive of the filler:

A. Normally liquid resin base about 66%, flexibilizer about 16%, and compatible wax or waxy material about 18%, B. Normally liquid curing agent about 55% and compatible wax or waxy material about 45%;

said ingredients being in terms of weight % in said respective A and B compositions.

13. A formulation having particular utility for temporarily stopping seepage or like leaks in tanks and pipes through which liquids are flowing at low pressures or through which liquids are adapted to flow, said formulation having a putty or putty-like consistency as prepared, and being prepared by admixing separate A and B compositions as set forth below:

A. A putty or putty-like product including a normally liquid epoxide resin base and a substantially inert filler;

B. A putty or putty-like product including a normally liquid curing agent for said normally liquid epoxide resin base of product A, and a substantially inert filler;

a compatible wax or waxy material being present in at least one of said A and B products, said compatible wax or waxy material being present in an amount in relation to and in cooperation with said epoxide resin base and said curing agent, when said A and B compositions are admixed in predetermined proportions and applied to a crevice or the like through which said liquids are flowing or adapted to flow, to effect stoppage of said seepage shortly after such application and substantially prior to the curing of said epoxide resin base being completed, said amount of the wax or waxy material content of the A and B compositions constituting at least 10%, by weight, of the total of the A and B compositions based on the sum of the epoxide resin base, the curing agent and the wax or waxy material.

14. A formulation according to claim 13, in which the A and B compositions are as follows:

A. An epoxide base resin composition comprising a mixture of a liquid resin in the form of a methylol modified bisphenol A type diglycidol ether, and octadecenamide synthetic wax, and a finely divided inert filler;

B. A curing composition comprising a cure base containing an amido-amine curing agent, an octadecenamide synthetic wax, and a finely divided inert filler.

15. The formulation of claim 11, in which the A composition is present in proportions from 2 to 4 times greater than the proportions of the B composition.

16. In a method of stopping seepage or leakage of liquids flowing at low pressures from crevices in tanks and pipes, the step which comprises pressing into and adjacent said crevice a formulation of putty or putty-like consistency corresponding to that of claim 1 and permitting curing to take place to effect hardening of said formulation.

17. In a method of temporarily stopping seepage or leakage of liquids flowing at low pressures from crevices in tanks and pipes, the step which comprises pressing into and adjacent said crevice a formulation of putty or putty-like consistency corresponding to that of claim 6, and permitting curing to take place to effect hardening of said formulation.

18. In a method of temporarily stopping seepage or leakage of liquids flowing at low pressures from crevices in tanks and pipes, the step which comprises pressing into and adjacent said crevice a formulation of putty or putty-like consistency corresponding to that of claim 11, and permitting curing to take place to effect hardening of said formulation.

19. The method of claim 16, in which the flowing liquids are gasoline or diesel fuels in wing tanks of aircraft.

20. The method of claim 18, in which the flowing liquids are gasoline or diesel fuels in wing tanks of aircraft.

* * * * *